(12) United States Patent
Walker

(10) Patent No.: US 10,761,863 B2
(45) Date of Patent: Sep. 1, 2020

(54) MOBILE APPLICATION MANAGEMENT BY RUN-TIME INSERTION OF A REPLACEMENT INSTRUMENTATION OBJECT INTO A MOBILE APPLICATION PROCESS

(71) Applicant: Citrix Systems, Inc., Fort Lauderdale, FL (US)

(72) Inventor: James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 96 days.

(21) Appl. No.: 16/145,814

(22) Filed: Sep. 28, 2018

(65) Prior Publication Data

US 2020/0104144 A1 Apr. 2, 2020

(51) Int. Cl.
*G06F 9/451* (2018.01)
*G06F 8/34* (2018.01)
*G06F 3/0484* (2013.01)
*G06F 8/20* (2018.01)

(52) U.S. Cl.
CPC .......... *G06F 9/451* (2018.02); *G06F 3/04842* (2013.01); *G06F 8/34* (2013.01); *G06F 8/24* (2013.01)

(58) Field of Classification Search
None
See application file for complete search history.

(56) References Cited

U.S. PATENT DOCUMENTS

| | | | |
|---|---|---|---|
| 8,578,443 | B2 | 11/2013 | Narain et al. |
| 9,396,325 | B2 | 7/2016 | Kendall |
| 9,405,723 | B2 | 8/2016 | Koneru et al. |
| 9,436,371 | B2 | 9/2016 | Simon et al. |
| 9,501,315 | B2 | 11/2016 | Ham et al. |
| 9,542,552 | B2 | 1/2017 | Peterson |
| 2014/0059703 | A1* | 2/2014 | Hung |
| 2016/0087953 | A1* | 3/2016 | Aamir |

OTHER PUBLICATIONS

Mearian, Lucas, "What is app wrapping? One way to more secure mobile apps," Computerworld, IDG Communications, Inc., 2018, Published on Jul. 21, 2017 <<www.computerworld.com/article/3209907/mobile-apps/app-wrapping-the-key-to-more-secure-mobile-app-management.html>> accessed Nov. 5, 2018, 8 pages.

* cited by examiner

*Primary Examiner* — Syed A Roni
(74) *Attorney, Agent, or Firm* — BainwoodHuang

(57) ABSTRACT

Starting execution of a mobile application on a mobile device includes creating a process that is used by the operating system of the mobile device to execute the mobile application on the mobile device. An initialization method is invoked by the mobile application that i) instantiates a replacement instrumentation object, and ii) assigns the replacement instrumentation object to the process used by the operating system to execute the mobile application on the mobile device. The replacement instrumentation object processes calls from the operating system to the mobile application and redirects at least one call made by the operating system to the mobile application to at least one call to mobile application management logic executing on the mobile device.

17 Claims, 5 Drawing Sheets

---

400 OPERATING SYSTEM OF A MOBILE DEVICE STARTS EXECUTION OF A MOBILE APPLICATION ON PROCESSING CIRCUITRY OF THE MOBILE DEVICE, AT LEAST IN PART BY CREATING A PROCESS USED BY THE OPERATING SYSTEM TO EXECUTE THE MOBILE APPLICATION ON THE PROCESSING CIRCUITRY OF THE MOBILE DEVICE

402 IN RESPONSE TO THE OPERATING SYSTEM OF THE MOBILE DEVICE STARTING EXECUTION OF THE MOBILE APPLICATION ON THE PROCESSING CIRCUITRY OF THE MOBILE DEVICE, THE MOBILE APPLICATION INVOKES AN INITIALIZATION METHOD, THE INITIALIZATION METHOD I) INSTANTIATING A REPLACEMENT INSTRUMENTATION OBJECT, AND II) ASSIGNING THE REPLACEMENT INSTRUMENTATION OBJECT TO THE PROCESS USED BY THE OPERATING SYSTEM TO EXECUTE THE MOBILE APPLICATION ON THE PROCESSING CIRCUITRY OF THE MOBILE DEVICE

404 IN RESPONSE TO THE ASSIGNMENT OF THE INSTRUMENTATION OBJECT TO THE PROCESS USED BY THE OPERATING SYSTEM TO EXECUTE THE MOBILE APPLICATION ON THE PROCESSING CIRCUITRY OF THE MOBILE DEVICE, THE REPLACEMENT INSTRUMENTATION OBJECT PROCESSES CALLS FROM THE OPERATING SYSTEM TO THE MOBILE APPLICATION, AT LEAST IN PART BY REDIRECTING AT LEAST ONE CALL TO THE MOBILE APPLICATION TO AT LEAST ONE CALL TO MOBILE APPLICATION MANAGEMENT LOGIC ALSO EXECUTING ON THE PROCESSING CIRCUITRY OF THE MOBILE DEVICE

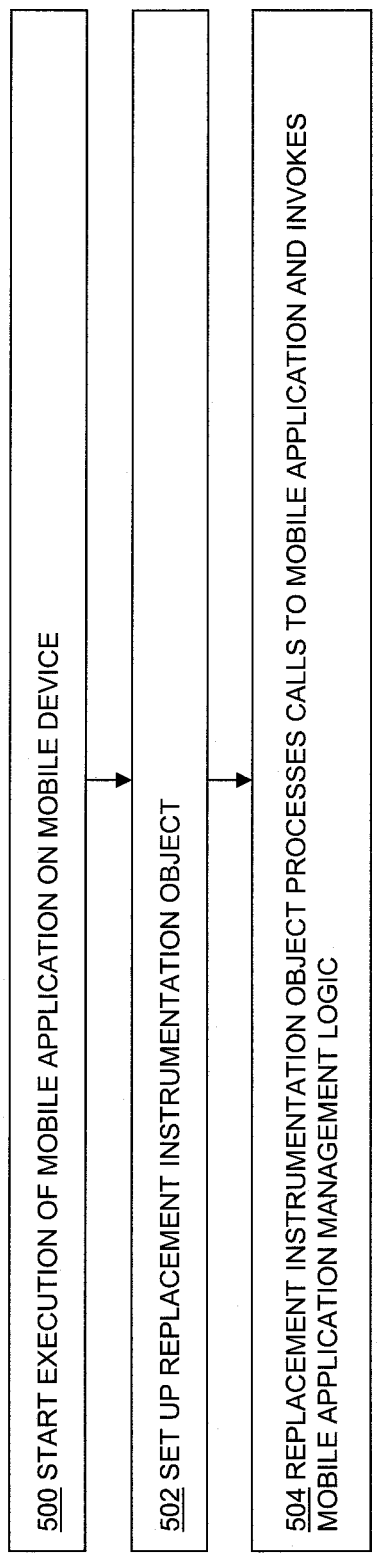

MOBILE APPLICATION MANAGEMENT BY RUN-TIME INSERTION OF A REPLACEMENT INSTRUMENTATION OBJECT INTO A MOBILE APPLICATION PROCESS

TECHNICAL FIELD

The present disclosure relates generally to mobile application management of mobile applications on a mobile device in a networked computer system, and more specifically to providing mobile application management of a mobile application on a mobile device through run-time insertion of a replacement instrumentation object into a mobile application process.

BACKGROUND

As it is generally known, a mobile application (sometimes referred to as an "app") is a computer program designed to run on a mobile device such as a smartphone, tablet or watch. Mobile devices are often sold with some mobile applications that are bundled as pre-installed software. Mobile applications that are not preinstalled may be distributed through distribution platforms known as app stores. Mobile applications can also be installed manually, for example by running an Android application package on an Android device.

The widespread adoption and use of mobile applications has given rise to the need for Mobile Application Management (MAM) systems that automatically control specific mobile application functions in response to a set of mobile application management policies. For example, management of mobile applications may be important in an environment in which the mobile applications are deployed by a business enterprise to a user's mobile device, and in which the mobile applications may potentially be used to access and use secure resources belonging to the business enterprise. In such an operational environment, the enterprise may desire that access to and/or use of the enterprise's secure resources be permitted from mobile applications only in accordance with a set of mobile application management policies that are defined by the enterprise.

SUMMARY

Previous approaches to providing MAM support in mobile applications have included application wrapping based techniques. Application wrapping is performed by running an application wrapping program on a previously compiled mobile application, prior to installation and execution of a modified version of the mobile application on a mobile device. The application wrapping program automatically identifies and modifies all the parts of the mobile application that need to be modified to support a corresponding MAM management service, prior to installation of the mobile application. Each specific MAM management service provides its own application wrapping program, and running that application wrapping program on a mobile application modifies the mobile application such that the resulting modified mobile application can be managed using the corresponding MAM management service. For example, a mobile application modified by an application wrapping program corresponding to the Intune management service provided by Microsoft Corporation is capable of being managed by the Intune management service. However, in previous systems, running the application wrapping program corresponding to a specific management service on a mobile application has typically resulted in a significantly modified mobile application that can only be managed using that management service. This result runs counter to some customers' need to manage mobile applications using different management services at different times, and/or to use multiple manage services at the same time. Another problem with application wrapping in previous systems is caused by the use of a single application wrapping program to wrap different mobile applications. In such circumstances, the application wrapping program may inject all potentially needed MAM functionality into every application that it is run on, regardless of whether specific types of MAM functionality are needed by specific individual applications. In some cases, the total amount of MAM program code added by the application wrapping program to cover the management needs of all mobile applications may be as much as 10 megabytes. This "one size fits all" approach to including management support can automatically add a large amount of unneeded MAM program code to an application during the application wrapping process. For example, in some previous systems, an application wrapping program may automatically add MAM program code that supports policy-based control of access to a mobile devices camera to every program it is applied to. However, some mobile applications do not even include program code that uses the camera of the mobile device, and for those applications the camera management program code automatically added by the application wrapping program is unneeded. In addition to unneeded program code, previous MAM application wrapping programs may automatically add unneeded native libraries, and unneeded resources, such as strings that are only required in MAM user interfaces that are not used when managing the specific application being wrapped.

In order to avoid problems of previous application wrapping approaches, Software Development Kit (SDK) based techniques have also been used to provide MAM capabilities in mobile applications. In previous SDK based approaches, the application developer manually modifies the source code of the mobile application during application development to include MAM capability at each and every management inflection point. MAM functionality that may potentially be needed by the developer is made available to the developer outside the mobile application program code, within files of an SDK corresponding to a specific MAM management service. A MAM system standard provided by the MAM management service instructs the developer as to how the mobile application should be modified during the development process to support the MAM management service. For example, in order to modify a mobile application so that it can be managed by the Intune management service, the developer must follow a programming standard corresponding to the Intune service. The developer determines the specific MAM program code and/or resources from the SDK that are actually needed to support MAM for the specific mobile application, and modifies the mobile application such that when the modified mobile application is compiled and made ready for installation, only the MAM program code and/or resources that are needed by that specific mobile application are included in the executable version of the modified mobile application that is installed on the mobile device. In this way, an SDK based approach may avoid the inclusion of unneeded program code and/or resources in the installable version of the mobile application would typically occur when using application wrapping based techniques. However, learning and applying complex MAM system standards for modifying a mobile application can be a difficult and time consuming task for a developer, and introduce significant delays to the development process. Some previous MAM system standards have required extensive changes to mobile applications, and even changing the entire code structure of the mobile application, changing the names of all their objects and methods, and/or invoking specific helper functions before and after specific functions within the mobile application. In addition, extensive changes to the mobile application made by the developer to meet the requirements of some previous MAM system standards have made it difficult or even impossible to make additional changes to the mobile application to comply with a second MAM system standard, so that the mobile application can be managed by multiple MAM systems.

To address the above described and other shortcomings of previous technical solutions, new technology is described herein for providing mobile application management of a mobile application. In the disclosed technology, execution of a previously installed mobile application is started by an operating system of the mobile device on the processing circuitry of a mobile device. The operating system starts execution of the mobile application on the processing circuitry of the mobile device at least in part by creating a process that is used by the operating system to execute the mobile application on the processing circuitry of the mobile device.

An initialization method is invoked by the mobile application in response to the operating system of the mobile device starting execution of the mobile application on the processing circuitry of the mobile device. The initialization method i) instantiates a replacement instrumentation object, and ii) assigns the replacement instrumentation object to the process that is used by the operating system to execute the mobile application on the processing circuitry of the mobile device.

In response to the replacement instrumentation object being assigned to the process that is used by the operating system to execute the mobile application on the processing circuitry of the mobile device, the replacement instrumentation object processes calls from the operating system to the mobile application. Processing calls from the operating system to the mobile application includes redirecting, by the replacement instrumentation object, at least one call made by the operating system to the mobile application, to at least one call to mobile application management logic also executing on the processing circuitry of the mobile device.

In some embodiments, processing calls from the operating system to the mobile application by the replacement instrumentation object includes processing at least one call from the operating system to logic within the mobile application in response to a mobile application management policy stored in the mobile device, and the call from the operating system to the logic within the mobile application may be redirected to a call to mobile application management logic that locks the mobile application. The mobile application management logic that locks the mobile application may operate at least in part by displaying at least one mobile application management window in a graphical user interface of the mobile device, such that displaying the mobile application management window at least temporarily blocks user interaction with the mobile application.

In some embodiments, the mobile application management logic that locks the mobile application may cause the mobile application management window to become a currently active window within the graphical user interface of the mobile device, and processing calls from the operating system to the mobile application by the replacement instrumentation object may include suppressing a subsequently received call from the operating system to an object within the mobile application corresponding to an application window that was previously the currently active window in the graphical user interface of the mobile device. The subsequently received call that is suppressed indicates that the application window that was previously the currently active window within the graphical user interface of the mobile device has been moved to a background of the graphical user interface of the mobile device. In addition, the mobile application management logic that locks the mobile application may at a later time cause the mobile application management window within the graphical user interface of the mobile device to be closed, resulting in the application window that was previously the currently active window again becoming the currently active window within the graphical user interface of the mobile device. Processing calls from the operating system to the mobile application by the replacement instrumentation object may further include suppressing another, second call to the object within the mobile application corresponding to the application window that was previously the currently active window within the graphical user interface of the mobile device. The second call that is suppressed indicates that the application window that was previously the currently active window within the graphical user interface of the mobile device has again become the currently active window within the graphical user interface of the mobile device.

In some embodiments, the mobile application management window displayed within the graphical user interface of the mobile device by the mobile application management logic that locks the mobile application may include or consist of a dialog box graphical control element, at least one progress bar graphical control element, and/or one or more other specific graphical control elements that may be generated by the mobile application management logic that locks the mobile application.

In some embodiments, processing the call from the operating system to logic within the mobile application by the replacement instrumentation object in response to the mobile application management policy may include or consist of processing a call from the operating system to logic within the mobile application that accesses a managed resource.

In some embodiments, in response to processing the call from the operating system to logic within the mobile application that causes the mobile application to access the managed resource, the mobile application management window displayed in the graphical user interface of the mobile device by the mobile application management logic that locks the mobile application may include or consist of at least one authentication user interface that authenticates a user of the mobile device.

In some embodiments, in response to processing the call from the operating system to logic within the mobile application that causes the mobile application to access the managed resource, the replacement instrumentation object may redirect the call to the logic within the mobile application that causes the mobile application to access the managed resource to a call to mobile application management logic that causes communications between the mobile application and the managed resource to be performed over a secure communication channel, such as a Virtual Private Network (VPN).

In some embodiments, the replacement instrumentation object may process calls from the operating system to the mobile application at least in part by i) processing a call from the operating system to logic within the mobile application that violates a mobile application management policy, and ii) redirecting the call from the operating system to the logic within mobile application that violates the mobile application management policy to a call to mobile application management logic that locks the mobile application at least in part by displaying a mobile application management window in a graphical user interface of the mobile device, wherein the mobile application management window blocks further user interaction with the mobile application and displays a message indicating that the mobile application is locked due to a policy violation.

In some embodiments, mobile device management logic may be provided that is operable to detect that the mobile device has been rooted. In such embodiments, processing a call from the operating system to logic within the mobile application that violates the mobile application management policy may include or consist of processing a call to logic within the mobile application that performs a function that is not permitted by mobile application management policy when the mobile device has been rooted.

In some embodiments, the calls from the operating system to the mobile application that are processed by the replacement instrumentation object may be a subset of all calls passed from the operating system to the mobile application. The subset of calls from the operating system to the mobile application that are processed by the replacement instrumentation object may include or consist of those calls from the operating system to the mobile application that are calls to methods of objects of an object class that creates windows in the graphical user interface of the mobile device.

In some embodiments, the operating system of the mobile device may be embodied as an Android™ operating system. In such embodiments, instantiating the replacement instrumentation object may be provided by instantiating an object of the Instrumentation object class that is defined by the Android™ operating system, and the subset of all calls from the operating system to the mobile application that are processed by the replacement instrumentation object may be calls to methods of objects of the Activity object class that is defined by the Android™ operating system.

In some embodiments the initialization method uses Java Reflection to assign the replacement instrumentation object to the process used by the operating system to execute the mobile application on the processing circuitry of the mobile device.

In some embodiments, an application wrapping program may be applied to the mobile application, after the mobile application has been compiled, to automatically insert, into the mobile application by the application wrapping program, a call to the initialization method that is invoked by the mobile application when execution of the mobile application is started on the processing circuitry of the mobile device.

Embodiments of the technology described herein may provide significant advantages over previous solutions. Embodiments of the disclosed technology advantageously inject a replacement Instrumentation Object into a deployed and installed mobile application that is running on a mobile device, and that is not undergoing testing or debugging. The disclosed run-time creation, injection, and operation of the disclosed replacement Instrumentation Object by embodiments of the disclosed technology stands in clear contrast to previous uses of the Instrumentation Object class defined in the Android™ operating system. In the Android™ operating system, Instrumentation is a base class provided for implementing application instrumentation code. When running an application with instrumentation turned on, the Instrumentation class is instantiated before any of the application code, allowing a developer to monitor all of the interaction the system has with the application. An Instrumentation implementation may be described to an Android™ system through an AndroidManifest.xml's <instrumentation> tag. The Instrumentation Object class has previously been used during application development, by a developer who is debugging or otherwise testing an application under development by, for example, monitoring ("instrumenting") that application from a second debug application. In contrast to such previous uses of Instrumentation Objects, the replacement Instrumentation Object of the disclosed technology is created, inserted and used at run-time, outside of the debugging environment, in a mobile application that is not undergoing testing and/or debugging, in order to provide specific run-time MAM control over the mobile application that would not otherwise be possible.

In another example, embodiments of the disclosed technology may be provided that advantageously allow a Software Development Kit (SDK) based solution to be used to provide mobile application management, thus avoiding shortcomings associated with previous application wrapping approaches. In embodiments that use an SDK based approach, the application developer need only modify the source code of the mobile application during application development to include a single call to an initialization method in order to provide mobile application management capabilities in the mobile application. The replacement instrumentation object created by the initialization method provides control over the mobile application to support mobile application management, without requiring the application developer to extensively modify the mobile application program code during the development process. In addition, in some SDK based embodiments, the application developer may expressly indicate the specific mobile application management logic (e.g. run-time library from the SDK) that is needed to manage the mobile application, thus eliminating the inclusion of potentially large amounts of unneeded mobile application logic with the mobile application.

In embodiments that suppress a call from the operating system to an object within the mobile application corresponding to an application window that was previously the currently active window in the graphical user interface of the mobile device, in response to a determination that i) the call indicates that the application window that was previously the currently active window within the graphical user interface of the mobile device has been moved to a background of the graphical user interface of the mobile device and ii) the reason that the application window that was previously currently active window was moved to the background is that a mobile application management window has been made the currently active window, the disclosed technology prevents the object corresponding to the application window that was previously the currently active window from behaving in an incorrect manner. Such possible incorrect behavior arises from the fact that under some circumstances, some mobile applications close the application when an application window that is the currently active window is moved into the background of the graphical user interface. For example, some mobile application objects present a user interface window asking the user to accept an required license agreement, such as an End User Licensing Agreement (EULA), and assume that if the license acceptance user interface window is moved to the background of the graphical user interface, then the user has rejected the required license, and therefore operate by closing the application in response to detecting that the license acceptance user interface window has been moved to the background of the graphical user interface. However, when a mobile application management window has been temporarily placed on top of the license acceptance user interface window by the disclosed technology, e.g. temporarily made the currently active window in order to obtain the user's authentication credentials, the user has not rejected the license, and should still be allowed to accept the license after the mobile application management window has been closed. By suppressing the call from the operating system indicating that the application window that was previously the currently active window has been moved to the background of the graphical user interface in the case where the mobile application management logic has made a mobile application management window the currently active window in the graphical user interface of the mobile device, embodiments of the disclosed technology prevent the mobile application object that generated the window that was previously the currently active window from receiving that call, and thus prevent some mobile applications from incorrectly closing the application.

The small amount of modifications to the mobile application that are required by the disclosed technology also allows the mobile application to be further modified to support management by multiple MAM systems, either by additional SDK based modifications and/or by modifications accomplished by additional application wrapping.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different figures. The elements of the drawings are not necessarily drawn to scale, emphasis instead being placed upon illustrating the principles of the various embodiments.

FIG. 5 is a second flow chart illustrating steps performed during operation of some embodiments of the disclosed technology.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. Support for all such combinations, permutations and/or variations is considered to exist in this document.

As described herein, execution of a previously installed mobile application is started by an operating system of the mobile device on the processing circuitry of a mobile device. The operating system starts execution of the mobile application on the processing circuitry of the mobile device at least in part by creating a process that is used by the operating system to execute the mobile application on the processing circuitry of the mobile device. An initialization method is invoked by the mobile application in response to the operating system of the mobile device starting execution of the mobile application on the processing circuitry of the mobile device. The initialization method i) instantiates a replacement instrumentation object, and ii) assigns the replacement instrumentation object to the process that is used by the operating system to execute the mobile application on the processing circuitry of the mobile device. In response to the replacement instrumentation object being assigned to the process used by the operating system to execute the mobile application on the processing circuitry of the mobile device, the replacement instrumentation object processes calls from the operating system to the mobile application. Processing the calls from the operating system to the mobile application includes redirecting, by the replacement instrumentation object, at least one call made by the operating system to the mobile application, to at least one call to mobile application management logic also executing on the processing circuitry of the mobile device.

Figure 1:
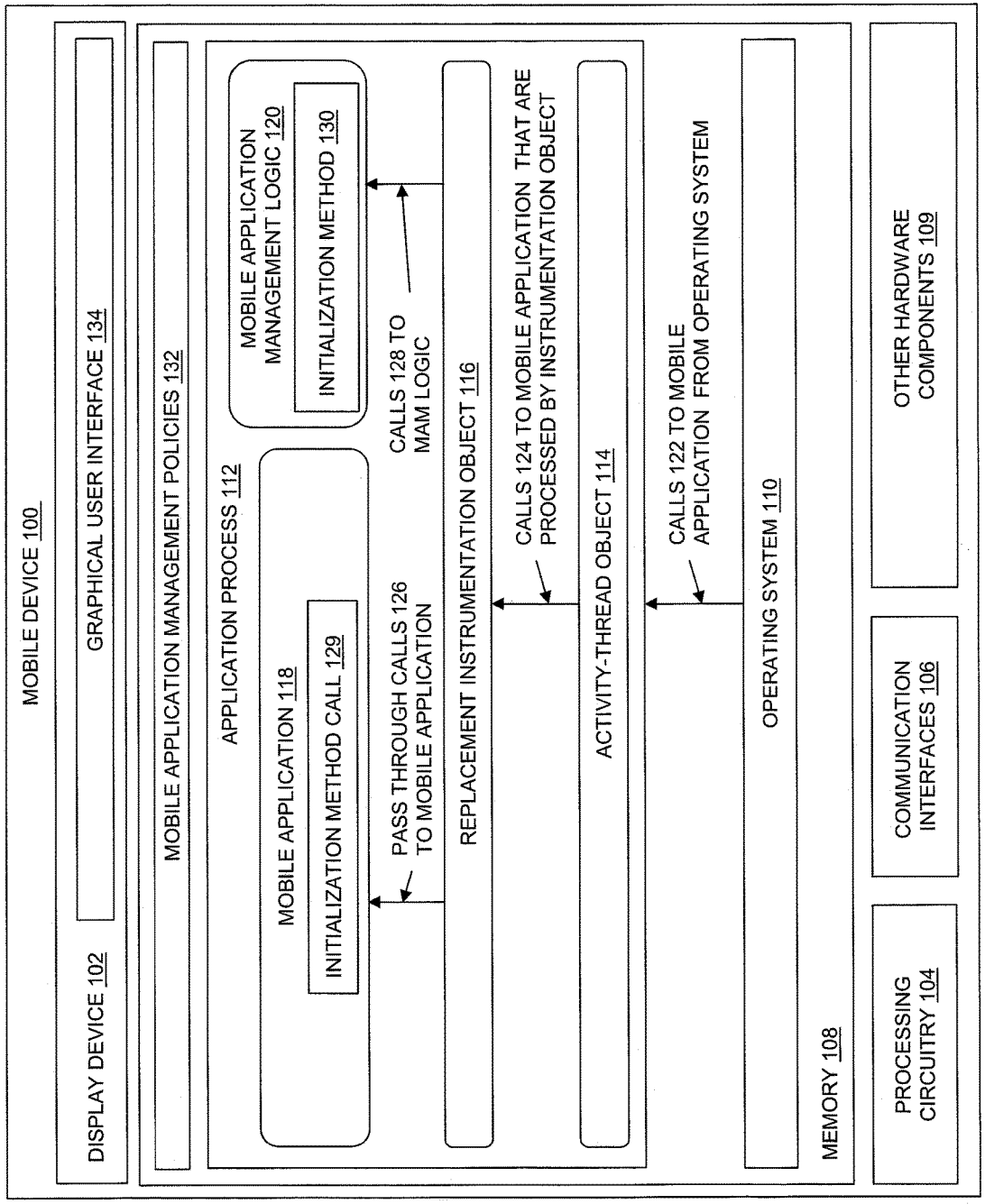
FIG. 1 is a block diagram showing a first example of components in some embodiments of the disclosed technology.

FIG. 1 is a block diagram showing a first example of components in some embodiments of the disclosed technology. As shown in FIG. 1, a Mobile Device 100 includes a Display Device 102, Processing Circuitry 104, Communication Interfaces 106, Memory 108, and Other Hardware Components 109. Mobile Device 100 may, for example, be a smart phone, tablet computer, e-book reader, or some other type of mobile computing device.

Display Device 102 may include or consist of an electronic visual display. A touch screen input device may be layered on top of the Display Device 102. A Graphical User Interface 134 for Mobile Device 100 may be displayed by Display Device 102.

Processing Circuitry 104 may include or consist of one or more Central Processing Units (CPUs) and associated hardware circuitry operable to execute program code stored in Memory 108.

Communication Interfaces 106 may include or consist of one more antennas and transmitter and receiver circuitry, that is operable to transmit and receive data over one or more wireless communication networks, including but not limited to one or more cellular networks, and other types of wireless communication networks, such as wireless Local Area Networks (LANs) or the like.

Memory 108 may include or consist of some combination of Random Access Memory (RAM) and Read Only Memory (ROM). In some embodiments, Memory 108 may include some amount of non-volatile solid state flash memory, which may be used at least in part to store the Operating System 110.

Other Hardware Components 109 may include or consist of various hardware devices and associated circuitry that is also contained in Mobile Device 100, such as a camera, microphone, speaker, etc.

Memory 108 stores program code components (e.g. instructions) that execute on Processing Circuitry 102. The program code is illustrated by Operating System 110 and Application Process 112. In some embodiments, the Operating System 110 may, for example, be embodied as the Android™ operating system developed by Google LLC. The Application Process 112 may include an Activity-Thread Object 114, a Replacement Instrumentation Object 116, Mobile Application 118, and Mobile Application Management Logic 120.

Mobile Application 118 includes software objects of a mobile application (or "app"), and was previously installed on the Mobile Device 100, e.g. by downloading of an Android Package (pkg) that contains Mobile Application 118 from a remotely located app store or the like into Memory 108. Mobile Application 118 may be embodied as any specific type of mobile application, such as, for example, a secure electronic mail application, or some other specific type of mobile application.

Mobile Application Management Logic 120 includes software objects that operate when executed to provide mobile application management functions. Mobile Application Management Logic 120 may, for example, be part of a Software Development Kit (SDK) that was used by a developer during the development of Mobile Application 118. Mobile Application Management Logic 120 may be a specific portion of the SDK that was expressly indicated by the developer for inclusion with Mobile Application 118 when Mobile Application 118 was distributed and installed. For example, Mobile Application Management Logic 120 may include or consist of a run-time library that is a subset of the SDK, and that is included as part of an Android Package (pkg) that is used to distribute and install Mobile Application 118. Accordingly, Mobile Application Management Logic 120 may have been downloaded to Mobile Device 100 together with Mobile Application 118 when Mobile Application 118 was installed onto Mobile Device 100, e.g. as a run-time library contained in an Android Package (pkg) used to install Mobile Application 118 onto Mobile Device 100.

Mobile Application Management Logic 120 may include program code that, when executed, provides various specific types of mobile application management (MAM) functionality. Such MAM functionality may, for example, include MAM functionality that at least temporarily locks Mobile Application 118 in response to a mobile application management policy (e.g. in response to a policy violation), MAM functionality that otherwise controls the use of various features within Mobile Application 118, MAM functionality that otherwise controls access by Mobile Application 118 to various specific local managed resources that are present on the Mobile Device 100, and/or to various specific remote managed resources that are located on other devices (e.g. on one or more remote servers, etc.), MAM functionality that monitors the performance and usage of Mobile Application 118, MAM functionality that performs user authentication prior to allowing Mobile Application 118 to perform specific functions and/or access specific managed resources, MAM functionality that wipes (deletes) data belonging to Mobile Application 118 in response to a policy violation, MAM functionality that redirects communications between Mobile Application 118 and one or more remote resources to a secure communication channel (e.g. to a Virtual Private Network (VPN)), and/or other specific types of MAM functionality.

During operation of some embodiments, a trigger event causes Operating System 110 to start execution of Mobile Application 118 on Processing Circuitry 104. Various specific trigger events may cause Operating System 110 to start execution of Mobile Application 118. For example, a user of Mobile Device 100 may cause Operating System 110 to start execution of Mobile Application 118 by pressing on an icon representing Mobile Application 118 in Graphical User Interface 134. Alternatively, another application may cause Operating System 110 to start execution of Mobile Application 118 by initiating communication with Mobile Application 118.

The Operating System 110 starts execution of Mobile Application 118 at least in part by creating Application Process 112. Operating System 110 then uses Application Process 112 to execute Mobile Application 118 on Processing Circuitry 104. For example, in embodiments in which Operating System 110 is the Android™ operating system, Operating System 110 creates a separate Linux process for each one of multiple mobile applications that may execute or are executing on Processing Circuitry 104, so that each application has its own process. Accordingly, in embodiments in which Operating System 110 is the Android™ operating system, Application Process 112 may be a Linux process.

In response to Operating System 110 starting execution of Mobile Application 118 on Processing Circuitry 104, Mobile Application 118 invokes an initialization method. In the example of FIG. 1, Mobile Application 118 includes Initialization Method Call 129 that, when executed, invokes Initialization Method 130. Initialization Method Call 129 may, for example, be located in the first callable method of Mobile Application 118 that is invoked by the Operating System 110 when execution of Mobile Application 118 is started.

In embodiments in which Operating System 110 is the Android™ operating system, the first callable method of Mobile Application 118 may be an attachBaseContext function that is called by Operating System 110 to set up a base context when Mobile Application 118 is started. In such embodiments, Initialization Method Call 129 may be added to the attachBaseContext function of Mobile Application 118 by the developer during application development, while developing Mobile Application 118 on a separate and independent development system, prior to compilation of Mobile Application 118 and installation of Mobile Application 118 on Mobile Device 100. Alternatively, similarly prior to installation of Mobile Application 118 on Mobile Device 100, an application wrapping program may be executed on the separate and independent development system. The application wrapping program may automatically insert, into Mobile Application 118 after Mobile Application 118 has been compiled, Initialization Method Call 129 into Mobile Application 118, e.g. by automatically inserting Initialization Method Call 129 into the attachBaseContext function of Mobile Application 118.

Invoking Initialization Method 130 through the Initialization Method Call 129 causes Initialization Method 130 to execute on Processing Circuitry 104. Initialization Method 130 instantiates Replacement Instrumentation Object 116. For example, in embodiments in which Operating System 110 is the Android™ operating system, Initialization Method 130 may instantiate Replacement Instrumentation Object 116 as an object of the Instrumentation object class that is defined by the Android™ operating system.

Initialization Method 130 also assigns Replacement Instrumentation Object 116 to Application Process 112. For example, in the case where Operating System 110 has already assigned a default instrumentation object to Application Process 112 prior to Initialization Method 130 being called, Initialization Method 130 replaces the default instrumentation object with Replacement Instrumentation Object 116. In some embodiments, Initialization Method 130 may use Java Reflection to replace the default instrumentation object that was previously assigned to Application Process 112 with the Replacement Instrumentation Object 116 that was instantiated by Initialization Method 130. For example, Operating System 110 may create Application Process 112 in part by creating a main execution thread for Application Process 112, shown by Activity-Thread Object 114 in FIG. 1. Operating System 110 may also assign a default object of the Instrumentation class to Activity-Thread Object 114 prior to Initialization Method 130 being invoked. When Initialization Method 130 is later invoked, Initialization Method 130 may use Java Reflection (e.g. calls to the Java Reflection Application Programming Interface (API)) to find Activity-Thread Object 114, and then modify a field in Activity-Thread Object 114 that indicates the Instrumentation object for Activity-Thread Object 114, so that the field points to Replacement Instrumentation Object 116 instead of to the default Instrumentation object originally assigned to Activity-Thread Object 114 by Operating System 110. In this way, some embodiments of Initialization Method 130 may use Java Reflection to assign Replacement Instrumentation Object 116 to Application Process 112 at run time.

In response to Replacement Instrumentation Object 116 being assigned to Application Process 112, Replacement Instrumentation Object 116 thereafter automatically processes at least some of the calls made by Operating System 110 to Mobile Application 118. For example, as shown in FIG. 1, Calls 122 from Operating System 110 to Mobile Application 118 may include some number of Calls 124 that are processed by Replacement Instrumentation Object 116. Calls 124 may be a subset of the Calls 122 that Activity Thread Object 114 passes to Replacement Instrumentation Object 116 instead of to Mobile Application 118.

The Calls 124 within Calls 122 that Activity Thread Object 114 passes to Replacement Instrumentation Object 116 instead of Mobile Application 118 may be less than all of the Calls 122 that are made by Operating System 110 to Mobile Application 118. For example, in embodiments in which the Operating System 110 is an Android™ operating system, Mobile Application 118 may be made up of four different classes of objects: Activity, Service, Broadcast Receiver, and Content Provider. The Activity, Service, Broadcast Receiver, and Content Provider classes are defined by the Android™ operating system. Objects of the Activity class in Mobile Application 118 are responsible for interacting with the user of the Mobile Device 100, and operate to create and otherwise manage windows within the Graphical User Interface 134 through which the user can interact with Mobile Application 118. Objects of the Service class in Mobile Application 118 run in the background to perform work for remote processes. Objects of the Broadcast Receiver class in Mobile Application 118 allow Mobile Application 118 to respond to broadcast announcements. Objects of the Content Provider class in Mobile Application 118 manage application data that is shared with other application.

In some embodiments, Calls 124 that are processed by Replacement Instrumentation Object 116 are only those calls within Calls 122 that are directed to methods of Activity objects within Mobile Application 118. In such embodiments, those calls within Calls 122 that are directed to methods of Service, Broadcast Receiver, and Content Provider objects in Mobile Application 118 are not processed by Replacement Instrumentation Object 116, and accordingly are passed by Activity-Thread Object 114 directly to Mobile Application 118.

Replacement Instrumentation Object 116 processes Calls 124 at least in part by redirecting at least one of the Calls 124 to Mobile Application Management Logic 120. As shown by Calls 128 to the Mobile Application Management Logic 120, Replacement Instrumentation Object 116 redirects some of the Calls 124 to calls to Mobile Application Management Logic 120. As shown by Pass Through Calls 126, Replacement Instrumentation Object 116 passes other ones of the Calls 124 directly to Mobile Application 118 without invoking Mobile Application Management Logic 120. For example, Replacement Instrumentation Object 116 may determine which ones of Calls 124 to redirect to Calls 128 to Mobile Application Management Logic 120 based on one or more policies stored in Mobile Application Management Policies 132. Such MAM policies may, for example, be provided by a policy service that distributes MAM policies to Mobile Device 100 and other mobile devices that operate within a common enterprise within which a common set of MAM policies are applied.

Figure 2:
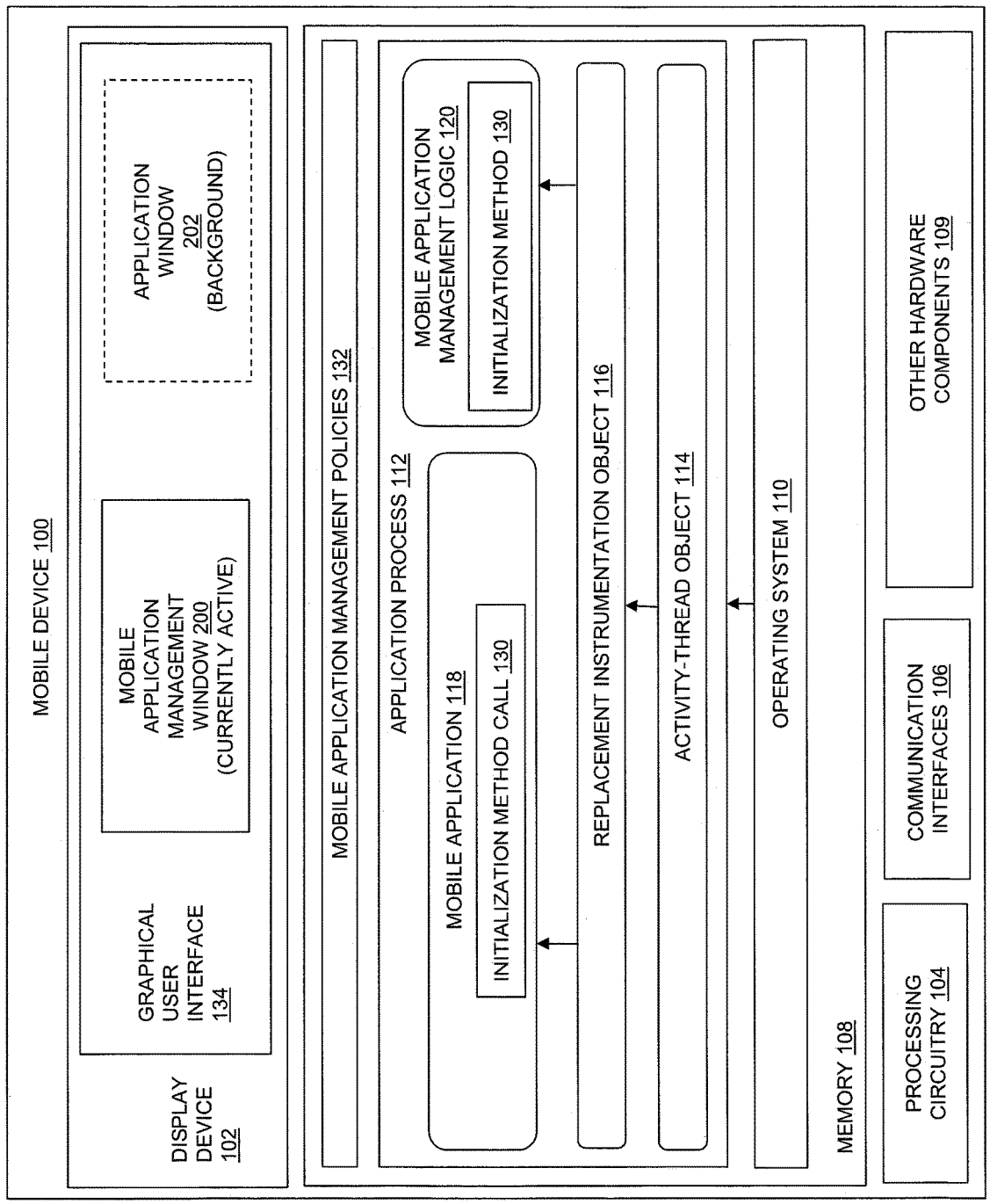
FIG. 2 is a block diagram showing a second example of components in some embodiments of the disclosed technology.

FIG. 2 is a block diagram showing a second example of components in some embodiments of the disclosed technology. As illustrated in FIG. 2, Replacement Instrumentation Object 116 may redirect a call issued by Operating System 110 to the Mobile Application 118 to a call to program logic within Mobile Application Management Logic 120 that at least temporarily locks the Mobile Application 118, e.g. by displaying Mobile Application Management Window 200 in Graphical User Interface 134, such that Mobile Application Management Window 200 blocks user interaction with the Mobile Application 118.

For example, Graphical User Interface 134 may include a windowing system in which only a single window has focus at any given time. In such embodiments, the window in Graphical User Interface 134 that currently has focus is the only window that can currently receive input from the user. The window that has focus in Graphical User Interface 134 is referred to as the currently active window. Windows other than the currently active window in Graphical User Interface 134 are referred to as background windows. Background windows cannot receive input from the user. In some embodiments or configurations, only the currently active window in Graphical User Interface 134 is visible, and all background windows are completely obscured by the currently active window. In other embodiments or configurations, a background window or windows may be partly or wholly visible at the same time as the currently active window.

In some embodiments, the program logic within Mobile Application Management Logic 120 that locks the Mobile Application 118 may lock Mobile Application 118 at least in part by causing the Mobile Application Management Window 200 to become the currently active window within Graphical User Interface 134. By making Mobile Application Management Window 200 the currently active window, Mobile Application Management Logic 120 prevents user interaction with any windows that are generated by Mobile Application 118, such as Application Window 202, since all other windows in the Graphical User Interface 134 are moved to the background of Graphical User Interface 134 when Mobile Application Management Window 200 is made the currently active window.

In some embodiments, processing calls from the Operating System 110 to the Mobile Application 118 by Replacement Instrumentation Object 116 may, under certain circumstances, include suppressing a call from the Operating System 110 to an object within the Mobile Application 118 that corresponds to Application Window 202, when Application Window 202 was previously the currently active window in Graphical User Interface 134, and where the call from Operating System 110 to Mobile Application 118 is a call that indicates that Application Window 202 has been moved to the background of Graphical User Interface 134. For example, Replacement Instrumentation Object 116 may suppress a call from Operating System 110 to an object in Mobile Application 118 that corresponds to Application Window 202, in the case where the call indicates that Application Window 202 has been moved to the background of Graphical User Interface 134, only when Application Window 202 has been moved to the background as a result of a window that was generated by the Management Application Management Logic 120, such as Mobile Application Management Window 200, being made the currently active window by Mobile Application Management Logic 120. By suppressing the call indicating that Application Window 202 has been moved to the background under such circumstances, Replacement Instrumentation Object 116 prevents the call from being received by the object in Mobile Application 118 that corresponds to Application Window 202. In this way, Replacement Instrumentation Object 116 prevents potential incorrect behavior by the object corresponding to the Application Window 202 when Application Window 202 is moved to the background of Graphical User Interface 134 as a result of Mobile Application Management Window 200 being made the currently active window. For example, suppression of such a call under such circumstances may prevent an object in Mobile Application 118 that corresponds to Application Window 202 from incorrectly determining that Application Window 202 was moved to the background because the user of Mobile Device 100 has rejected a required license agreement, such as an End User License Agreement (EULA) or the like that is presented for acceptance in Application Window 202. Such an incorrect determination may cause the object corresponding to Application Window 202 to terminate Mobile Application 118, because Mobile Application 118 cannot be used unless the user accepts the required license agreement, when in fact the reason that Application Window 202 was moved to the background is that Mobile Application Management Logic 120 caused. Mobile Application Management Window 200 to become the currently active window, e.g. for purposes of temporarily locking Mobile Application 118 in order for Mobile Application Management Logic 120 to perform some mobile application management function or operation, or to display mobile application management information.

In some embodiments, the Mobile Application Management Window 200 that locks Mobile Application 118 may include or consist of a dialog box graphical control element, at least one progress bar graphical control element, and/or one or more other specific graphical control elements that may be generated by Mobile Application Management Logic 120 that locks the Mobile Application 118 while performing a mobile application management operation or function.

In embodiments in which the Operating System 110 is the Android™ operating system, the object in Mobile Application 118 that corresponds to Application Window 202 may be an Activity object that operates to create and otherwise manage Application Window 202. Further in such embodiments, the call from Operating System 110 to the object within Mobile Application 118 that corresponds to Application Window 202, that indicates to the object within Mobile Application 118 that Application Window has been moved to the background of Graphical User Interface 134, may be an onPause method call.

Program logic within Mobile Application Management Logic 120 that locked the Mobile Application 118 by making Mobile Application Management Window 200 the currently active window may further operate to subsequently close Mobile Application Management Window 200. For example, after Mobile Application Management Logic 120 has successfully authenticated a user of the Mobile Device 100 based on one or more authentication credentials entered by the user through Mobile Application Management Window 200, Mobile Application Management Logic 120 may cause Mobile Application Management Window 200 to be closed. As a result of Mobile Application Management Window 200 being closed, Application Window 202, which had previously been the currently active window prior to Mobile Application Management Window 200 being made the currently active window, is again made the currently active window within Graphical User Interface 134. However, the object in Mobile Application 118 that corresponds to Application Window 202 has no knowledge that Application Window 202 was moved into the background, since the method call from Operating System 110 to the object corresponding to Application Window 202 indicating that Application Window 202 was moved to the background (e.g. the onPause method call) was suppressed by Replacement Instrumentation Object 116. In order to prevent the object in Mobile Application 118 that corresponds to Application Window 202 from receiving a call indicating that Application Window 202 has become the currently active window at a time when the object corresponding to Application Window 202 considers Application Window 202 to already be the currently active window, Replacement Instrumentation Object 116 suppresses another call from Operating System 110 to Mobile Application 118. This second call that is suppressed by Replacement Instrumentation Object 116 is a call to the object (e.g. the Activity object) in Mobile Application 118 that corresponds to Application Window 202, and indicates that Application Window 202 has again become the currently active window within the Graphical User Interface 134. A call from the Operating System 110 to the object that corresponds to Application Window 202, indicating that the Application Window 202 has again become the currently active object, is suppressed by Replacement Instrumentation Object 116 in the case where the reason that Application Window 202 has again become the currently active window is because a window created by Mobile Application Management Logic 120 that was the currently active window has been closed by Mobile Application Management Logic 120. In embodiments in which the Operating System 110 is the Android™ operating system, the call that indicates that Application Window 202 has again become the currently active window within the Graphical User Interface 134 may be a call to the onResume method of an Activity object in Mobile Application 118 corresponding to Application Window 202.

In some embodiments, Replacement Instrumentation Object 116 may process a call from Operating System 110 to logic within the Mobile Application 118 that violates a mobile application management policy stored in Mobile Application Management Policies 132, and redirect the call to a call to program logic in Mobile Application Management Logic 120 that locks the Mobile Application at least in part by causing Mobile Application Management Window 200 to be displayed as the currently active window in Graphical User Interface 134. In some cases, depending on the policy that is violated, the Mobile Application Management Window 200 may block any further user interaction with the Mobile Application 118, and display a message indicating that Mobile Application 118 is locked due to violation of the policy.

In some embodiments, one or more policies in Mobile Application Management Policies 132 may indicate that some or all of the functions of Mobile Application 118 cannot be used under certain circumstances, e.g. when the Mobile Device 100 has been rooted. As it is generally known, rooting is a process that allows users of mobile devices running the Android™ operating system to attain privileged control (known as root access) over various Android™ subsystems. In some embodiments, Replacement Instrumentation Object 116 may check to determine whether Mobile Device 100 has been rooted while processing calls from the Operating System 110. In response to one or more policies in Mobile Application Management Policies 132 that restrict use of Mobile Application 118 when Mobile Device 100 has been rooted, and upon detecting that Mobile Device 100 has in fact been rooted, Replacement Instrumentation Object 116 may prevent one or more calls from Operating System 110 to functions in Mobile Application 118 that are not permitted when Mobile Device 100 has been rooted from being delivered to Mobile Application 118, and/or redirect one or more calls from Operating System 110 to functions in Mobile Application 118 that are not permitted when Mobile Device 100 has been rooted to program logic in Mobile Application Management Logic 120 that prevents the use of some or all of the functions of Mobile Application 118, e.g. by at least temporarily locking Mobile Application 118 by displaying Mobile Application Management Window 200 as the currently active window in Graphical User Interface 134.

Figure 3:
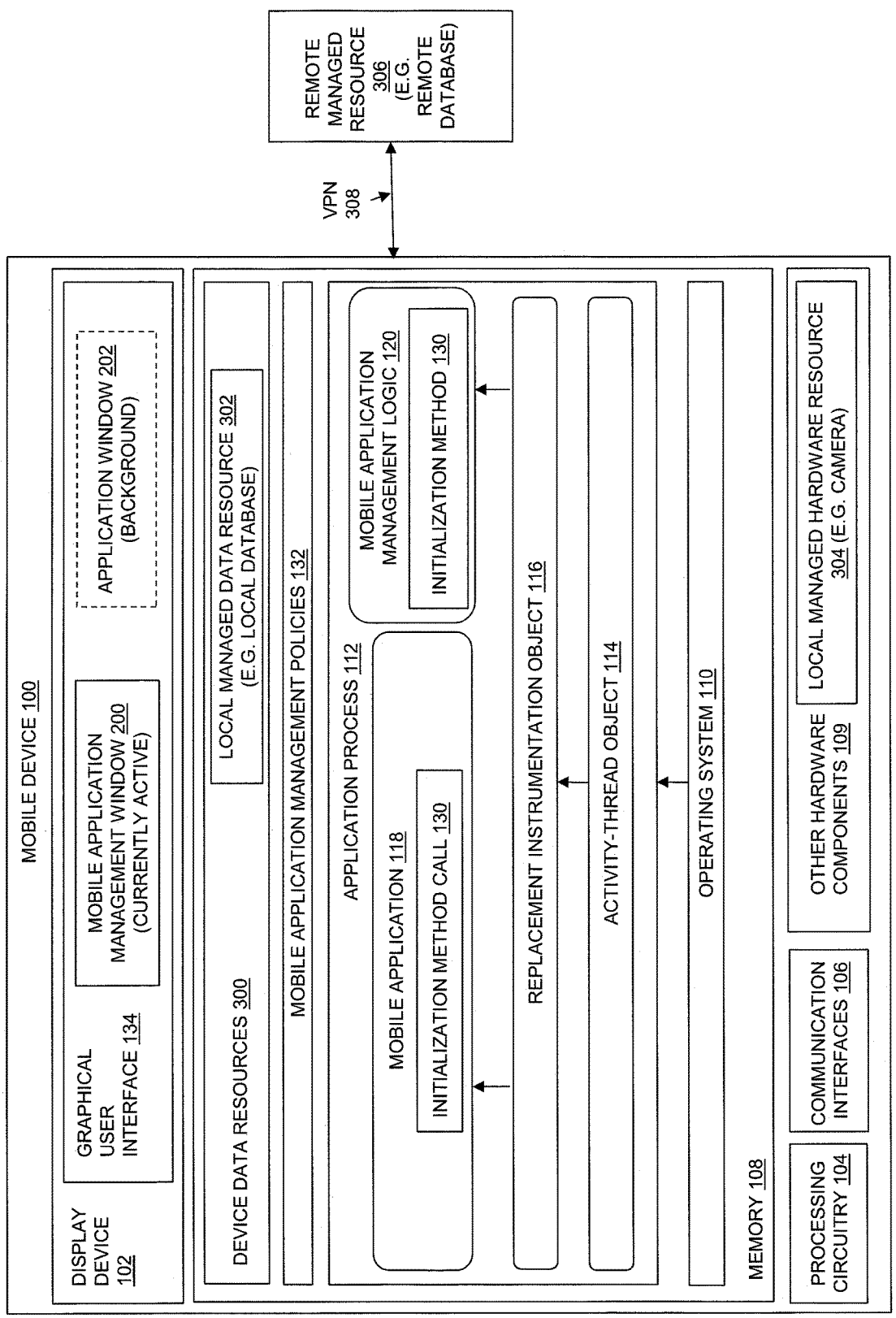
FIG. 3 is a block diagram showing a third example of components in some embodiments of the disclosed technology.

FIG. 3 is a block diagram showing a third example of components in some embodiments of the disclosed technology. As shown in FIG. 3, the disclosed technology may be embodied to provide control over how or whether Mobile Application 118 accesses various types of managed resources. For example, the disclosed technology can be embodied to control access by Mobile Application 118 to i) a Local Managed Data Resource 302, such as a local data base stored in Memory 108, ii) a Local Managed Hardware Resource 304, such as a camera or other hardware device within the Mobile Device 100, and/or iii) a Remote Managed Resource 306, such as a remote database or the like.

In some embodiments, one or more policies in Mobile Application Management Policies 132 may indicate to Replacement Instrumentation Object 116 one or more calls from Operating System 110 to program logic within Mobile Application 118 that access a managed resource (e.g. Local Managed Data Resource 302, Local Managed Hardware Resource 304, or Remote Managed Resource 306), and that should not be delivered, and/or should be redirected to calls to Mobile Application Management Logic 120. For example, Replacement Instrumentation Object 116 may redirect calls from Operating System 110 to program logic in Mobile Application 118 that accesses a managed resource to calls to program logic in Mobile Application Management Logic 120 that performs authentication of the user of Mobile Device 100 prior to allowing Mobile Application 118 to access the managed resource. Such authentication may, for example, be accomplished at least in part by displaying an authentication user interface including or consisting of one or more mobile application management windows, such as Mobile Application Window 200, in the Graphical User Interface 134, in order to obtain one or more authentication credentials (e.g. username, password, personal identification number, one time passcode, etc.) from the user of the Mobile Device 100.

In some embodiments, Replacement Instrumentation Object 116 may redirect calls from Operating System 110 to program logic in Mobile Application 118 that accesses a remote managed resource, such as Remote Managed Resource 306, to calls to program logic in Mobile Application Management Logic 120 that, when executed, causes the Mobile Application 118 to access the remote managed resource to over a secure communication channel. For example, such program logic in Mobile Application Management Logic 120 may cause communications between the Mobile Application 118 and the managed resource, such as data retrieval operations performed by Mobile Application 118 on the remote managed resource, to be performed over a Virtual Private Network (VPN) 308. In order to cause communications between the Mobile Application 118 and the managed resource to be performed over VPN 308, Mobile Application Management Logic 120 may initially establish VPN 308 between the Mobile Device 100 and a remote server system that hosts the Remote Managed Resource 306.

Figure 4:
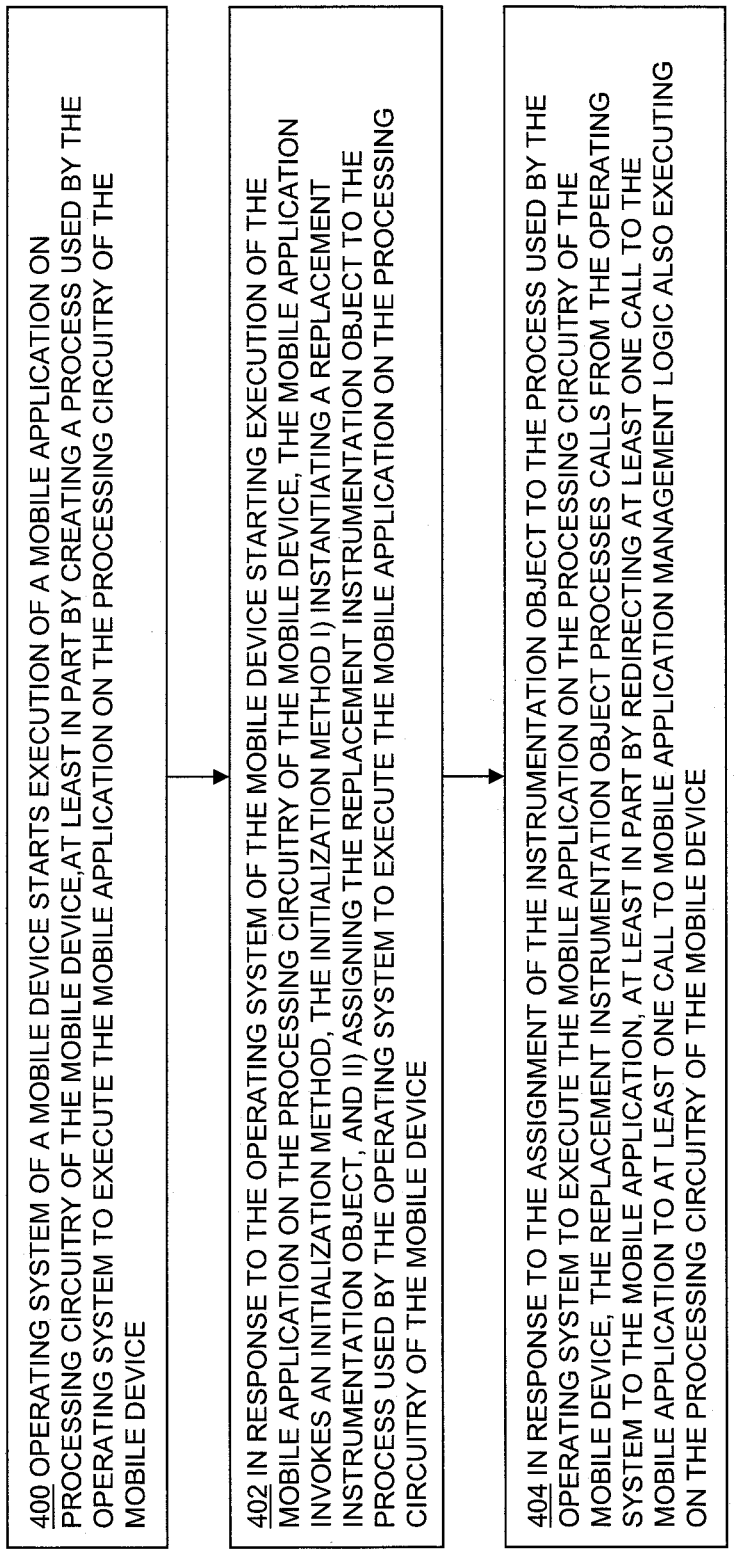
FIG. 4 is a first flow chart illustrating steps performed during operation of some embodiments of the disclosed technology.

FIG. 4 is a first flow chart illustrating steps performed during operation of some embodiments of the disclosed technology. As shown in FIG. 4, at step 400 an operating system of a mobile device starts execution of a mobile application on processing circuitry of the mobile device, at least in part by creating a process used by the operating system to execute the mobile application on the processing circuitry of the mobile device.

At step 402, in response to the operating system of the mobile device starting execution of the mobile application on the processing circuitry of the mobile device, the mobile application invokes an initialization method, the initialization method i) instantiating a replacement instrumentation object, and ii) assigning the replacement instrumentation object to the process used by the operating system to execute the mobile application on the processing circuitry of the mobile device. For example, the following pseudo-code demonstrates how Java Reflection may be used in some embodiments to replace a default Instrumentation object for a mobile application process with a newly instantiated replacement Instrumentation object at run time:

```
1. MyInstrumentation myInstrumentation = new MyInstrumentation( );
2. Class<?> cls = Class.forName("android.app.ActivityThread");
3. Method = cls.getDeclaredMethod("currentActivityThread");
4. Object activityThread = method.invoke(null, null);
5. for(Field field: cls.getDeclaredFields( ))
    {
      if(field.getName( ).equals("mInstrumentation"))
      {
        field.setAccessible(true);
        field.set(activityThread, myInstrumentation);
          break;
      }
    }
```

In the above pseudo-code, in step 1, a new object MyInstrumentation is created of the class Instrumentation. In step 2, the Class is obtained for the main thread (ActivityThread) of the process that is used by the operating system to execute the mobile application (e.g. for the mobile application "android.app"). In step 3, a method named "currentActivityThread" is obtained, and at step 4 an instance of ActivityThread is obtained. Then, in step 5, the field named "mInstrumentation" is located and the current Instrumentation object is replaced with the newly created replacement Instrumentation object (MyInstrumentation) from step 1.

At step 404 of FIG. 4, in response to the assignment of the newly created replacement Instrumentation object to the process used by the operating system to execute the mobile application on the processing circuitry of the mobile device, the newly created replacement instrumentation object processes calls from the operating system to the mobile application, at least in part by redirecting at least one call to the mobile application to at least one call to mobile application management logic also executing on the processing circuitry of the mobile device.

FIG. 5 is a second flow chart illustrating steps performed during operation of some embodiments of the disclosed technology. At step 500, execution of a mobile application is started on a mobile device. At step 502, a replacement Instrumentation object for the mobile application is set up and assigned to a process that executes the mobile application on the mobile device. At step 504, the replacement Instrumentation object processes calls made by the operating system of the mobile device to the mobile application and redirects some of the calls to mobile application management logic also executing on the mobile device.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, functions of the embodiments illustrated herein may take the form of a computer program product embodied at least in part in one or more non-transitory computer readable storage medium(s) having computer readable program code stored thereon for causing one or more processors to carry out those functions.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that one or more of the block in such figures, and combinations of the blocks, can be implemented by computer program instructions. These computer program instructions may be executed on processing circuitry to form specialized hardware. The computer program instructions may further be loaded onto a mobile computing device to produce a machine, such that the instructions which execute on the mobile computing device create means for implementing the functions specified in the block or blocks. The computer program instructions may also be stored in a computer-readable memory that can direct a mobile computing device to function in a particular manner, such that the instructions stored in the computer-readable memory produce an article of manufacture including instruction means which implement the function specified in the block or blocks. The computer program instructions may also be loaded onto a mobile computing device to cause a series of operational steps to be performed to produce a computer implemented process such that the instructions which execute on the mobile computing device provide steps for implementing the functions specified in the block or blocks.

It will also be understood by those of ordinary skill in the art that modification to and variation of the illustrated embodiments may be made without departing from the inventive concepts described herein.

What is claimed is:

1. A method of providing mobile application management of a mobile application, comprising:

starting execution of the mobile application on processing circuitry of a mobile device, by an operating system of the mobile device, wherein starting execution of the mobile application on the processing circuitry of the mobile device includes creating a process used by the operating system to execute the mobile application on the processing circuitry of the mobile device;

invoking, by the mobile application in response to the operating system of the mobile device starting execution of the mobile application on the processing circuitry of the mobile device, an initialization method, wherein the initialization method i) instantiates a replacement instrumentation object, and ii) assigns the replacement instrumentation object to the process used by the operating system to execute the mobile application on the processing circuitry of the mobile device;

processing, by the replacement instrumentation object in response to the replacement instrumentation object being assigned to the process used by the operating system to execute the mobile application on the processing circuitry of the mobile device, calls from the operating system to the mobile application, wherein the processing includes processing a call from the operating system to logic within the mobile application in response to a mobile application management policy by redirecting, by the replacement instrumentation object, at least one call to the mobile application to at least one call to mobile application management logic executing on the processing circuitry of the mobile device that locks the mobile application, wherein the mobile application management logic that locks the mobile application operates at least in part by displaying at least one mobile application management window in a graphical user interface of the mobile device, wherein displaying the mobile application management window blocks user interaction with the mobile application and causes the mobile application management window to become a currently active window within the graphical user interface of the mobile device; and wherein processing calls from the operating system to the mobile application by the replacement instrumentation object further includes suppressing a first call from the operating system to an object within the mobile application corresponding to an application window that was previously the currently active window in the graphical user interface of the mobile device, wherein the first call indicates that the application window that was previously the currently active window within the graphical user interface of the mobile device has been moved to a background of the graphical user interface of the mobile device.

2. The method of claim 1, wherein the mobile application management logic that locks the mobile application further operates by causing the mobile application management window within the graphical user interface of the mobile device to be closed, resulting in the application window that was previously the currently active window within the graphical user interface of the mobile device again becoming the currently active window within the graphical user interface of the mobile device; and wherein processing calls from the operating system to the mobile application by the replacement instrumentation object includes suppressing a second call to the object within the mobile application corresponding to the application window that was previously the currently active window within the graphical user interface of the mobile device, wherein the second call indicates that the application window that was previously the currently active window within the graphical user interface of the mobile device has again become the currently active window within the graphical user interface of the mobile device.

3. The method of claim 2, wherein the mobile application management window displayed within the graphical user interface of the mobile device by the mobile application management logic that locks the mobile application comprises a dialog box graphical control element.

4. The method of claim 2, wherein the mobile application management window displayed within the graphical user interface of the mobile device by the mobile application management logic that locks the mobile application comprises at least one progress bar graphical control element.

5. The method of claim 1, wherein processing calls from the operating system to the mobile application by the replacement instrumentation object further includes:

processing a call from the operating system to logic within the mobile application that violates a mobile application management policy; and redirecting the call from the operating system to the logic within mobile application that violates the mobile application management policy to a call to mobile application management logic that locks the mobile application at least in part by displaying a mobile application management window in a graphical user interface of the mobile device, wherein the mobile application management window blocks further user interaction with the mobile application and displays a message indicating that the mobile application is locked.

6. The method of claim 5, further comprising:

detecting that the mobile device has been rooted; and wherein processing the call from the operating system to logic within the mobile application that violates the mobile application management policy comprises processing a call to logic within the mobile application that performs a function that is not permitted by mobile application management policy when the mobile device has been rooted.

7. The method claim 1, wherein the calls from the operating system to the mobile application that are processed by the replacement instrumentation object comprise a subset of all calls from the operating system to the mobile application; and wherein the subset of all calls from the operating system to the mobile application that are processed by the replacement instrumentation object comprises those calls from the operating system to the mobile application that are calls to methods of objects of an object class that creates windows in the graphical user interface of the mobile device.

8. The method of claim 7, wherein instantiating the replacement instrumentation object comprises instantiating an object of an Instrumentation object class that is defined by the operating system; and wherein the subset of all calls from the operating system to the mobile application that are processed by the replacement instrumentation object comprises calls to methods of objects of an Activity object class that is defined by the operating system.

9. The method of claim 8, wherein the initialization method uses Java reflection to assign the replacement instrumentation object to the process used by the operating system to execute the mobile application on the processing circuitry of the mobile device.

10. The method of claim 1, further comprising automatically inserting, into the mobile application by an application wrapping program after the mobile application has been compiled, a call to the initialization method that is invoked by the mobile application when execution of the mobile application is started on the processing circuitry of the mobile device.

11. A method of providing mobile application management of a mobile application, comprising:

starting execution of the mobile application on processing circuitry of a mobile device, by an operating system of the mobile device, wherein starting execution of the mobile application on the processing circuitry of the mobile device includes creating a process used by the operating system to execute the mobile application on the processing circuitry of the mobile device;

invoking, by the mobile application in response to the operating system of the mobile device starting execution of the mobile application on the processing circuitry of the mobile device, an initialization method, wherein the initialization method i) instantiates a replacement instrumentation object, and ii) assigns the replacement instrumentation object to the process used by the operating system to execute the mobile application on the processing circuitry of the mobile device;

processing, by the replacement instrumentation object in response to the replacement instrumentation object being assigned to the process used by the operating system to execute the mobile application on the processing circuitry of the mobile device, calls from the operating system to the mobile application, wherein the processing includes processing a call from the operating system to logic within the mobile application in response to a mobile application management policy by redirecting, by the replacement instrumentation object, at least one call to the mobile application to at least one call to mobile application management logic executing on the processing circuitry of the mobile device that locks the mobile application, wherein the mobile application management logic that locks the mobile application operates at least in part by displaying at least one mobile application management window in a graphical user interface of the mobile device, wherein displaying the mobile application management window blocks user interaction with the mobile application; and wherein processing the call from the operating system to logic within the mobile application by the replacement instrumentation object in response to the mobile application management policy comprises processing a call from the operating system to logic within the mobile application that accesses a managed resource.

12. The method of claim 11, further comprising:
in response to processing the call from the operating system to logic within the mobile application that causes the mobile application to access the managed resource, displaying, as the at least one mobile application management window displayed in the graphical user interface of the mobile device by the mobile application management logic that locks the mobile application, at least one authentication user interface that authenticates a user of the mobile device.

13. The method of claim 11, further comprising:
in response to processing the call from the operating system to logic within the mobile application that causes the mobile application to access the managed resource, redirecting the call to the logic within mobile application that causes the mobile application to access the managed resource to a call to mobile application management logic that causes communications between the mobile application and the managed resource to be performed over a secure communication channel.

14. A mobile device, comprising:
processing circuitry;
a memory storing program code, wherein the program code stored in the memory is executable on the processing circuitry, and wherein the program code, when executed by the processing circuitry, is configured and arranged to:
  start execution of the mobile application on processing circuitry of a mobile device, by an operating system of the mobile device, wherein execution of the mobile application is started on the processing circuitry of the mobile device at least in part by creation of a process by the operating system that is used by the operating system to execute the mobile application on the processing circuitry of the mobile device;
  invoke, by the mobile application in response to the operating system of the mobile device starting execution of the mobile application on the processing circuitry of the mobile device, an initialization method, wherein the initialization method i) instantiates a replacement instrumentation object, and ii) assigns the replacement instrumentation object to the process used by the operating system to execute the mobile application on the processing circuitry of the mobile device;
  process, by the replacement instrumentation object in response to the replacement instrumentation object being assigned to the process used by the operating system to execute the mobile application on the processing circuitry of the mobile device, calls from the operating system to the mobile application, wherein the processing of the calls from the operating system to the mobile application includes processing a call from the operating system to logic within the mobile application in response to a mobile application management policy by redirecting, by the replacement instrumentation object, at least one call to the mobile application to at least one call to mobile application management logic executing on the processing circuitry of the mobile device that locks the mobile application, wherein the mobile application management logic that locks the mobile application operates at least in part by displaying at least one mobile application management window in a graphical user interface of the mobile device, wherein displaying the mobile application management window blocks user interaction with the mobile application and causes the mobile application management window to become a currently active window within the graphical user interface of the mobile device; and
  wherein processing calls from the operating system to the mobile application by the replacement instrumentation object further includes suppressing a first call from the operating system to an object within the mobile application corresponding to an application window that was previously the currently active window in the graphical user interface of the mobile device, wherein the first call indicates that the application window that was previously the currently active window within the graphical user interface of the mobile device has been moved to a background of the graphical user interface of the mobile device.

15. A non-transitory computer readable medium storing program code for providing mobile application management of a mobile application, wherein the program code, when executed by processing circuitry, causes the processing circuitry to perform a method of:
  starting execution of the mobile application on processing circuitry of a mobile device, by an operating system of the mobile device, wherein starting execution of the mobile application on the processing circuitry of the mobile device includes creating a process used by the operating system to execute the mobile application on the processing circuitry of the mobile device;
  invoking, by the mobile application in response to the operating system of the mobile device starting execution of the mobile application on the processing circuitry of the mobile device, an initialization method, wherein the initialization method i) instantiates a replacement instrumentation object, and ii) assigns the replacement instrumentation object to the process used by the operating system to execute the mobile application on the processing circuitry of the mobile device;
  processing, by the replacement instrumentation object in response to the replacement instrumentation object being assigned to the process used by the operating system to execute the mobile application on the processing circuitry of the mobile device, calls from the operating system to the mobile application, wherein the processing includes processing a call from the operating system to logic within the mobile application in response to a mobile application management policy by redirecting, by the replacement instrumentation object, at least one call to the mobile application to at least one call to mobile application management logic executing on the processing circuitry of the mobile device that locks the mobile application, wherein the mobile application management logic that locks the mobile application operates at least in part by displaying at least one mobile application management window in a graphical user interface of the mobile device, wherein displaying the mobile application management window blocks user interaction with the mobile application and causes the mobile application management window to become a currently active window within the graphical user interface of the mobile device; and
  wherein processing calls from the operating system to the mobile application by the replacement instrumentation object further includes suppressing a first call from the operating system to an object within the mobile application corresponding to an application window that was previously the currently active window in the graphical user interface of the mobile device, wherein the first call indicates that the application window that was previously the currently active window within the graphical user interface of the mobile device has been moved to a background of the graphical user interface of the mobile device.

16. A mobile device, comprising:

processing circuitry;

a memory storing program code, wherein the program code stored in the memory is executable on the processing circuitry, and wherein the program code, when executed by the processing circuitry, is configured and arranged to:
- start execution of the mobile application on processing circuitry of a mobile device, by an operating system of the mobile device, wherein execution of the mobile application is started on the processing circuitry of the mobile device at least in part by creation of a process by the operating system that is used by the operating system to execute the mobile application on the processing circuitry of the mobile device;
- invoke, by the mobile application in response to the operating system of the mobile device starting execution of the mobile application on the processing circuitry of the mobile device, an initialization method, wherein the initialization method i) instantiates a replacement instrumentation object, and ii) assigns the replacement instrumentation object to the process used by the operating system to execute the mobile application on the processing circuitry of the mobile device;
- process, by the replacement instrumentation object in response to the replacement instrumentation object being assigned to the process used by the operating system to execute the mobile application on the processing circuitry of the mobile device, calls from the operating system to the mobile application, wherein the processing of the calls from the operating system to the mobile application includes processing a call from the operating system to logic within the mobile application in response to a mobile application management policy by redirecting, by the replacement instrumentation object, at least one call to the mobile application to at least one call to mobile application management logic executing on the processing circuitry of the mobile device that locks the mobile application, wherein the mobile application management logic that locks the mobile application operates at least in part by displaying at least one mobile application management window in a graphical user interface of the mobile device, wherein displaying the mobile application management window blocks user interaction with the mobile application; and
- wherein processing the call from the operating system to logic within the mobile application by the replacement instrumentation object in response to the mobile application management policy comprises processing a call from the operating system to logic within the mobile application that accesses a managed resource.

17. A non-transitory computer readable medium storing program code for providing mobile application management of a mobile application, wherein the program code, when executed by processing circuitry, causes the processing circuitry to perform a method of:
- starting execution of the mobile application on processing circuitry of a mobile device, by an operating system of the mobile device, wherein starting execution of the mobile application on the processing circuitry of the mobile device includes creating a process used by the operating system to execute the mobile application on the processing circuitry of the mobile device;
- invoking, by the mobile application in response to the operating system of the mobile device starting execution of the mobile application on the processing circuitry of the mobile device, an initialization method, wherein the initialization method i) instantiates a replacement instrumentation object, and ii) assigns the replacement instrumentation object to the process used by the operating system to execute the mobile application on the processing circuitry of the mobile device;
- processing, by the replacement instrumentation object in response to the replacement instrumentation object being assigned to the process used by the operating system to execute the mobile application on the processing circuitry of the mobile device, calls from the operating system to the mobile application, wherein the processing includes processing a call from the operating system to logic within the mobile application in response to a mobile application management policy by redirecting, by the replacement instrumentation object, at least one call to the mobile application to at least one call to mobile application management logic executing on the processing circuitry of the mobile device that locks the mobile application, wherein the mobile application management logic that locks the mobile application operates at least in part by displaying at least one mobile application management window in a graphical user interface of the mobile device, wherein displaying the mobile application management window blocks user interaction with the mobile application and causes the mobile application management window to become a currently active window within the graphical user interface of the mobile device; and
- wherein processing the call from the operating system to logic within the mobile application by the replacement instrumentation object in response to the mobile application management policy comprises processing a call from the operating system to logic within the mobile application that accesses a managed resource.

\* \* \* \* \*